US012538069B2

(12) United States Patent
Irii et al.

(10) Patent No.: US 12,538,069 B2
(45) Date of Patent: Jan. 27, 2026

(54) EARPHONE

(71) Applicant: Audio-Technica Corporation, Tokyo (JP)

(72) Inventors: Koichi Irii, Tokyo (JP); Yusuke Sano, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 193 days.

(21) Appl. No.: 18/433,780

(22) Filed: Feb. 6, 2024

(65) Prior Publication Data

US 2024/0214719 A1 Jun. 27, 2024

Related U.S. Application Data

(63) Continuation of application No. PCT/JP2023/025906, filed on Jul. 13, 2023.

(30) Foreign Application Priority Data

Aug. 10, 2022 (JP) ................................ 2022-128394

(51) Int. Cl.
*H04R 19/01* (2006.01)
*H04R 1/10* (2006.01)
(Continued)

(52) U.S. Cl.
CPC ......... *H04R 1/2834* (2013.01); *H04R 1/1016* (2013.01); *H04R 1/2803* (2013.01); *H04R 2460/11* (2013.01)

(58) Field of Classification Search
CPC ...... H04R 19/01; H04R 19/013; H04R 19/02; H04R 1/10; H04R 1/1016; H04R 1/1075;
(Continued)

(56) References Cited

U.S. PATENT DOCUMENTS 3,789,166 A * 1/1974 Sebesta .................... H04R 1/44 381/189
3,963,881 A * 6/1976 Fraim .................... H04R 19/04 381/174
(Continued)

FOREIGN PATENT DOCUMENTS

CN 106170106 A 11/2016
JP 2940418 B2 * 8/1999
(Continued)

*Primary Examiner* — Edgardo San Martin
(74) *Attorney, Agent, or Firm* — WCF IP

(57) ABSTRACT

An earphone includes a housing that is connected with a nozzle for emitting sound to the outside, a fixed pole that is fixed inside the housing, a diaphragm that is provided so as to divide a space inside the housing into two, and vibrates in accordance with a potential difference generated between the diaphragm and the fixed pole facing each other, a support part that supports the diaphragm such that a portion of the diaphragm is in contact with the fixed pole, and an adjustment hole that is formed so as to penetrate a wall of the housing on a side opposite to the one having the nozzle, from the perspective of the diaphragm, and adjusts a pressure inside the housing. A through-membrane hole penetrating the diaphragm is formed in the portion of the diaphragm.

10 Claims, 8 Drawing Sheets

(51) Int. Cl.
*H04R 1/28* (2006.01)
*H04R 7/24* (2006.01)
*H04R 19/02* (2006.01)

(58) Field of Classification Search
CPC ...... H04R 1/28; H04R 1/2803; H04R 1/2823; H04R 1/2811; H04R 1/283; H04R 1/2834; H04R 1/2815; H04R 7/04; H04R 7/16; H04R 7/24; H04R 25/00; H04R 2460/11
See application file for complete search history.

(56) References Cited

U.S. PATENT DOCUMENTS

| | | | | | |
|---|---|---|---|---|---|
| 4,014,091 | A * | 3/1977 | Kodera | H04R 31/00 29/886 |
| 4,236,051 | A * | 11/1980 | Nakagawa | H04R 19/016 257/419 |
| 4,567,382 | A * | 1/1986 | van Halteren | H04R 19/01 29/886 |
| 4,701,640 | A * | 10/1987 | Flygstad | H04R 19/01 29/886 |
| 4,764,690 | A * | 8/1988 | Murphy | H04R 19/01 29/886 |
| 5,570,428 | A * | 10/1996 | Madaffari | H04R 19/01 381/174 |
| 6,031,922 | A * | 2/2000 | Tibbetts | H04R 25/60 381/313 |
| 6,510,231 | B2 * | 1/2003 | Barnert | H04R 19/00 381/174 |
| 6,668,064 | B1 * | 12/2003 | Lin | H04R 1/1016 381/328 |
| 8,483,399 | B2 * | 7/2013 | Shou | H04R 19/04 381/71.7 |
| 8,946,831 | B2 * | 2/2015 | Liu | B81C 1/00523 257/414 |
| 9,181,080 | B2 * | 11/2015 | Dehe | H04R 7/02 |
| 9,237,394 | B2 * | 1/2016 | Seo | H04R 1/1016 |
| 9,883,280 | B2 * | 1/2018 | Oosato | H04R 1/2857 |
| 10,045,126 | B2 * | 8/2018 | Berger | H04R 7/20 |
| 10,477,295 | B2 * | 11/2019 | Ouchi | H04R 1/2896 |
| 11,076,222 | B2 * | 7/2021 | Irii | H04R 19/005 |
| 12,047,737 | B2 * | 7/2024 | Zhang | H04R 1/1075 |
| 12,096,182 | B2 * | 9/2024 | Irii | H04R 19/02 |
| 2012/0002826 | A1 * | 1/2012 | Wu | H04R 19/01 381/191 |
| 2012/0243724 | A1 | 9/2012 | Takai et al. | |
| 2020/0196047 | A1 | 6/2020 | Irii et al. | |
| 2020/0204925 | A1 * | 6/2020 | Zou | H04R 7/02 |
| 2024/0171918 | A1 * | 5/2024 | Fukutome | B81B 3/0072 |
| 2024/0388850 | A1 * | 11/2024 | Irii | H04R 1/403 |
| 2025/0059024 | A1 * | 2/2025 | Rong | H04R 7/04 |

FOREIGN PATENT DOCUMENTS

| | | | | |
|---|---|---|---|---|
| JP | 2004-072368 | A | 3/2004 | |
| JP | 2011-049686 | A | 3/2011 | |
| JP | 5696249 | B1 * | 4/2015 | |
| JP | 2016021608 | A * | 2/2016 | |
| JP | 2020-098957 | A | 6/2020 | |
| JP | 2021-154436 | A | 10/2021 | |
| KR | 1020170139320 | A | 12/2017 | |
| WO | WO-2011114688 | A1 * | 9/2011 | H04R 9/063 |

* cited by examiner

B-B CROSS-SECTIONAL VIEW

EARPHONE

CROSS-REFERENCE TO RELATED APPLICATIONS

The present application is a U.S. National Stage entry of PCT Application number PCT/JP2023/25906, filed on Jul. 13, 2023, which claims priority under 35 U.S.C § 119(a) to Japanese Patent Application No. 2022-128394, filed on Aug. 10, 2022, contents of which are incorporated herein by reference in their entirety.

BACKGROUND OF THE INVENTION

The present disclosure relates to an earphone that transduces an electric signal into sound.

An earphone includes a plate-shaped fixed electrode (hereinafter, also referred to as a fixed pole) and a diaphragm provided to face the fixed pole. Japanese Unexamined Patent Application Publication No. 2020-98957 discloses a capacitor-type earphone in which a thin-film diaphragm is provided to divide a space in a housing into upper and lower sections.

In an earphone where it is desirable for pressures on both sides of a diaphragm in a housing to be equal, a pressure inside the housing changes when a user puts on or takes off the earphone to or from the user's ear, for instance. In order to adjust such a change in the pressure, it has been proposed to provide pressure adjustment holes on both sides of a housing. However, providing pressure adjustment holes on both sides of a housing makes the structure of the housing complicated, leading to an increase in manufacturing costs of the housing.

BRIEF SUMMARY OF THE INVENTION

The present disclosure focuses on this point, and an object thereof is to provide an earphone capable of adjusting internal pressure with a simple housing configuration.

A first aspect of the present disclosure provides an earphone that includes a housing that is connected with a nozzle for emitting sound to the outside, a fixed pole that is fixed inside the housing, a diaphragm that is provided so as to divide a space inside the housing into two, and vibrates in accordance with a potential difference generated between the diaphragm and the fixed pole facing each other, a support part that supports the diaphragm such that a portion of the diaphragm is in contact with the fixed pole, and an adjustment hole that is formed so as to penetrate a wall of the housing on a side opposite to the one having the nozzle, from the perspective of the diaphragm, and adjusts a pressure inside the housing, wherein a through-membrane hole penetrating the diaphragm is formed in the portion of the diaphragm.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Overview of Earphone>

An overview of an earphone according to the embodiment will be described with reference to FIG. 1.

Figure 1:
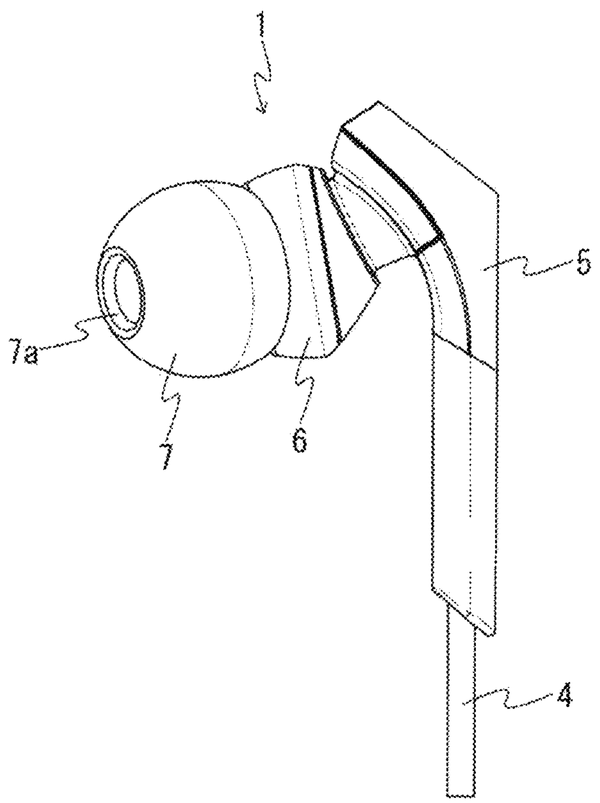
FIG. 1 schematically illustrates an external configuration of an earphone 1 according to an embodiment.

FIG. 1 schematically illustrates an external configuration of an earphone 1 according to the embodiment. The earphone 1 is a canal-type earphone here, but is not limited thereto, and may be, for example, an inner-ear type of earphone. As shown in FIG. 1, the earphone 1 includes a cable 4, a connecting part 5, a housing 6, and an earpiece 7.

The cable 4 is a cable for transmitting an electric signal supplied from a sound source.

The connecting part 5 is a member that connects the cable 4 and the housing 6. The connecting part 5 is formed of resin or the like, for example, to cover the cable 4.

The housing 6 is provided between the connecting part 5 and the earpiece 7. The housing 6 is provided with an electroacoustic transducer that transduces the electric signal transmitted through the cable 4 into sound. The detailed configuration of the electroacoustic transducer will be described later.

The earpiece 7 is a portion of the earphone 1 inserted into a user's ear. The earpiece 7 is attached to a nozzle (specifically, a nozzle 15 in FIG. 2) protruding from the housing 6. The earpiece 7 has an opening 7*a* for emitting the sound generated by the electroacoustic transducer.

In the above-mentioned earphone 1, a pressure inside the housing 6 changes when a user puts or takes off the earphone 1 on or from the user's ear. In order to adjust such a change in the pressure, it is necessary to provide a pressure adjustment hole to the housing 6. In the earphone 1 of the present embodiment, the pressure inside the housing 6 can be properly adjusted with a simple configuration of the housing 6 by providing a through-membrane hole in a diaphragm in the housing 6, as will be described in detail later.

<Detailed Configuration of Electroacoustic Transducer>

A detailed configuration of the electroacoustic transducer will be described with reference to FIGS. 2 to 4.

Figure 2:
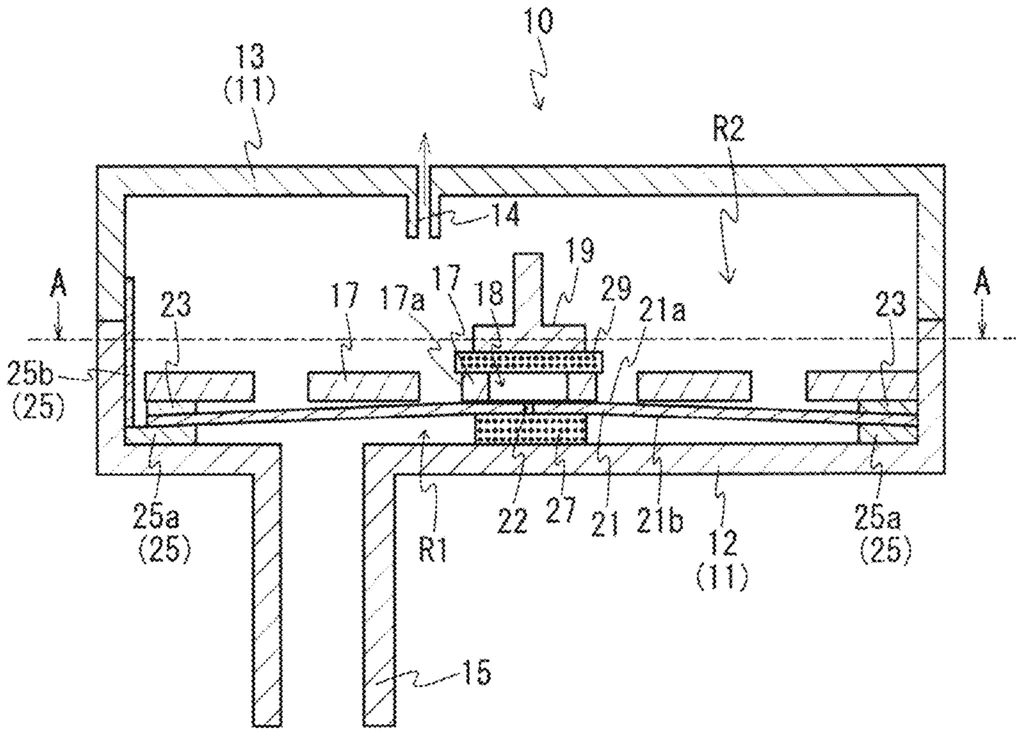
FIG. 2 schematically illustrates a configuration of an electroacoustic transducer 10.
Figure 3:
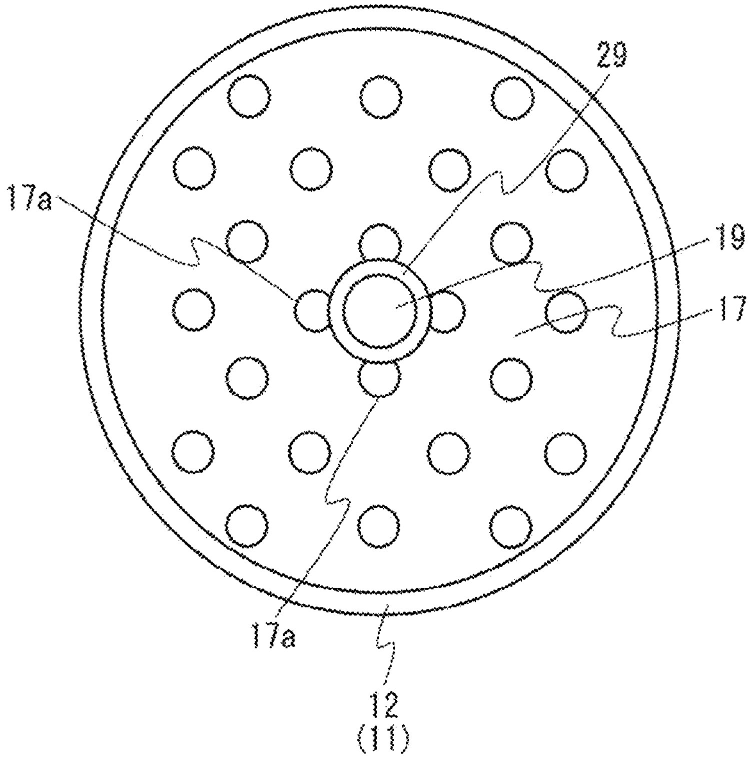
FIG. 3 is a schematic diagram of a view from a line A-A in FIG. 2.

FIG. 2 schematically illustrates a configuration of an electroacoustic transducer 10. FIG. 3 is a schematic diagram of a view from a line A-A in FIG. 2.

As shown in FIG. 2, the electroacoustic transducer 10 includes a housing 11, the nozzle 15, a fixed pole 17, a terminal 19, a diaphragm 21, an insulating member 23, a first conductive member 25, a support member 27, and a second conductive member 29.

The housing 11 forms a housing of the electroacoustic transducer 10, and has an internal space where the fixed pole 17, the diaphragm 21, and the like are disposed. The housing 11 corresponds to the housing 6 shown in FIG. 1. The housing 11 is made of resin here. As shown in FIG. 2, the housing 11 includes an ear-side housing 12 and an outer housing 13. The outer housing 13 and the ear-side housing 12 surround the internal space.

The ear-side housing 12 is a portion located proximate to the ear when the user puts the earphone 1 on the user's ear. The outer housing 13 is a portion located away from the ear when the user puts the earphone 1 on the user's ear. In the present embodiment, the ear-side housing 12 corresponds to a first housing, and the outer housing 13 corresponds to a second housing.

An adjustment hole 14 for adjusting the pressure inside the housing 11 is formed in the outer housing 13. As shown in FIG. 2, the adjustment hole 14 is formed so as to penetrate the outer housing 13, which is a wall of the housing 11 on a side opposite to the one having the nozzle 15 when viewed from the diaphragm 21. The adjustment hole 14 is formed so as to project from the outer housing 13 toward the internal space, and no protrusion or the like is formed on an outer peripheral surface of the outer housing 13. In the present embodiment, the adjustment hole 14 is provided only in the outer housing 13, among the ear-side housing 12 and the outer housing 13. This simplifies the configuration of the ear-side housing 12.

The nozzle 15 functions as a conduit for emitting sound to the outside. As shown in FIG. 2, the nozzle 15 is connected to the ear-side housing 12 of the housing 11. Specifically, the nozzle 15 is formed to project from the ear-side housing 12. The distal end of the nozzle 15 is detachably attached to the earpiece 7 (FIG. 1).

The fixed pole 17 is formed of a plate-shaped conductive member (for example, aluminum). The fixed pole 17 is fixed inside the housing 11. The fixed pole 17 generates an electric field between the fixed pole 17 and the diaphragm 21 when a bias voltage is applied through the terminal 19, for example. Further, the electric signal inputted from the sound source is inputted to the fixed pole 17 and the diaphragm 21 through the terminal 19 and the first conductive member 25, respectively.

A plurality of through holes 17*a* are formed in the fixed pole 17. As shown in FIG. 3, the plurality of through holes 17*a* are formed at predetermined intervals. As shown in FIG. 2, a through hole 18 is formed in a portion of the fixed pole 17 which is in contact with a central portion of the diaphragm 21 (specifically, a portion sandwiched between the central portion of the diaphragm 21 and the second conductive member 29). The diameter of the through hole 18 here is larger than the diameter of the through hole 17*a*.

The terminal 19 is a conductive terminal for supplying the electric signal to the fixed pole 17. The terminal 19 is electrically coupled to the fixed pole 17 and, for example, has input thereto the electric signal i) superimposed on the bias voltage and ii) supplied from the sound source. The terminal 19 is located on a side opposite to the side where the diaphragm 21 is located, from the perspective of the fixed pole 17.

The diaphragm 21 is a vibrating plate which is disposed so as to face the fixed pole 17, and vibrates on the basis of the electric signal supplied from the sound source. The diaphragm 21 is formed of a thin film having conductivity. The diaphragm 21 is formed of a metal foil or a polymer film on which gold is deposited, for example. The diaphragm 21 is provided to divide the space in the housing 11 into two. Specifically, as shown in FIG. 2, the space in the housing 11 is divided into a lower region R1 below the diaphragm 21 and an upper region R2 above the diaphragm 21.

The diaphragm 21 vibrates in accordance with a potential difference between the terminal 19 and the first conductive member 25 generated by the electric signal. Specifically, the diaphragm 21 vibrates in accordance with a potential difference between the diaphragm 21 and the fixed pole 17, generated on the basis of the electric signal applied to the terminal 19 and the first conductive member 25. More specifically, the diaphragm 21 vibrates in accordance with a change in a magnitude of an AC component of the potential difference generated between the terminal 19 and the first conductive member 25.

Figure 4:
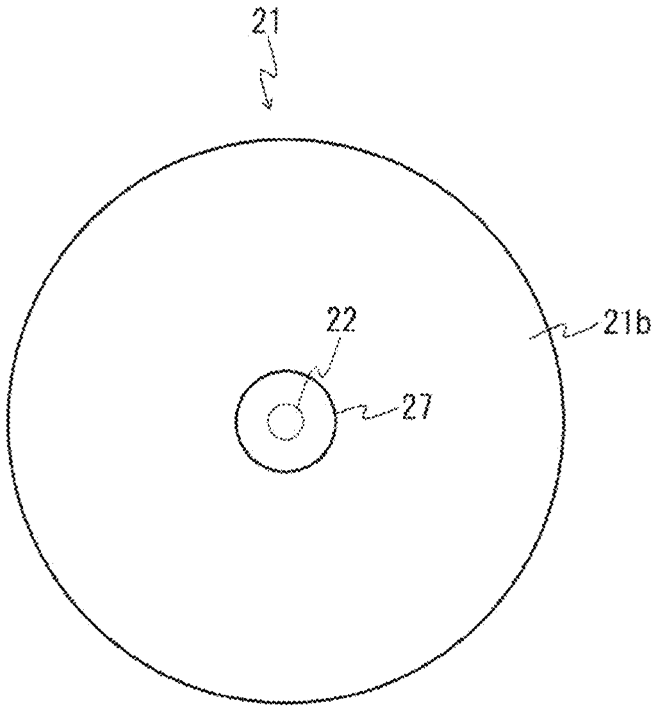
FIG. 4 schematically illustrates configurations of a diaphragm 21 and a support member 27.

FIG. 4 schematically illustrates configurations of the diaphragm 21 and the support member 27. FIG. 4 shows a lower surface 21*b* of the diaphragm 21 viewed from below. The through-membrane hole 22 penetrating the membrane is formed in the diaphragm 21. Here, one through-membrane hole 22 is formed at the central portion of the diaphragm 21. The diameter of the through-membrane hole 22 is 0.1 mm or less in the diaphragm 21 having a thickness of 2 μm. A ventilation amount of air passing through the through-membrane hole 22 is adjusted on the basis of the size of the diameter of the through-membrane hole 22.

The through-membrane hole 22 is formed here by melting the diaphragm 21 momentarily with laser heat to create an opening. In this case, the periphery of the hole is melted and reinforced by heat, which makes it easier to adjust the size of the through-membrane hole 22 and prevent the diaphragm 21 from being broken or damaged due to a load it receives during pressure changes when the earphone 1 is inserted into or removed from the ear.

In the above description, one through-membrane hole 22 is formed in the center of the diaphragm 21, but the present disclosure is not limited thereto, and for example, a plurality of through-membrane holes 22 may be formed. The number and diameter of the through-membrane holes 22 may be appropriately selected in consideration of the ventilation amount of air, acoustic design, and manufacturing method. Further, in the above description, a circular through-membrane hole 22 is formed by using a gas laser, but the present disclosure is not limited thereto, and for example, an elliptical through-membrane hole 22 may be formed by using a semiconductor laser. In this way, the through-membrane hole 22 can take various shapes.

The insulating member 23 is provided to secure a space for the diaphragm 21 to vibrate, and is formed of resin, for example. The insulating member 23 has, for example, an annular shape, and is sandwiched between a peripheral portion of the diaphragm 21 and the fixed pole 17, as shown in FIG. 2. As a result, the peripheral portion of the diaphragm 21 is fixed in a state not in contact with the fixed pole 17, and a region of the diaphragm 21 that is not in contact with the insulating member 23 (a region excluding the central portion of the diaphragm 21) vibrates in accordance with the electric signal.

The first conductive member 25 is a member for applying the electric signal to the diaphragm 21. The first conductive member 25 is formed of a conductive sheet, for example. As shown in FIG. 2, the first conductive member 25 includes an annular portion 25*a* which is in contact with the peripheral portion of the diaphragm 21, and an extending portion 25*b* which extends upward from at least a portion of the annular portion 25*a*. The extending portion 25*b* actually extends to the connecting part 5.

The support member 27 supports the diaphragm 21 so that a portion of the diaphragm 21 is in contact with the fixed pole 17. As shown in FIG. 2, the support member 27 is located on a side of the lower surface 21*b* of the diaphragm 21, and contacts the lower surface 21*b* of the diaphragm 21 to support the diaphragm 21. The support member 27 covers the central portion, which is a portion of the diaphragm 21, on a side of the diaphragm 21 opposite to the one in contact with the fixed pole 17. The support member 27 supports the lower surface 21*b* of the diaphragm 21, and therefore the central portion of the upper surface 21*a* of the diaphragm 21 is pressed against the fixed pole 17.

The support member 27 is disposed between the diaphragm 21 and the ear-side housing 12 of the housing 11 so as to be in contact with the lower surface 21*b* of the diaphragm 21 and the ear-side housing 12. The support member 27 is made of an elastic material having elasticity, and is provided to be deformable due to displacement of the diaphragm 21. For example, if the inside of the housing 11 is depressurized and the diaphragm 21 is displaced as the user removes the earphone 1 from the ear, the support member 27 is deformed due to the displacement of the diaphragm 21.

As shown in FIG. 4, the support member 27 covers the through-membrane hole 22. The support member 27 is made of an elastic material with air permeability that allows air to pass through its inside. Here, the elastic material is a sponge, for example. Since the support member 27 has air permeability in this manner, the air passing through the through-membrane hole 22 of the diaphragm 21 can pass through the support member 27 which is in contact with the through-membrane hole 22, for example.

As shown in FIG. 2, the second conductive member 29 is interposed between the fixed pole 17 and the terminal 19. The second conductive member 29 is disposed to cover the through hole 18 of the fixed pole 17. The second conductive member 29 functions as an acoustic resistance between the fixed pole 17 and the terminal 19, and so the acoustic characteristics can be adjusted. In particular, a wide range of acoustic characteristics can be adjusted by using both the first conductive member 25 and the second conductive member 29.

The second conductive member 29 has air permeability that allows air to pass through its inside. For example, the second conductive member 29 is formed of a conductive cloth. The second conductive member 29 has air permeability in this manner, and therefore makes it easy for the air in the lower region R1 to flow into the upper region R2, passing through the through-membrane hole 22 of the diaphragm 21 and the second conductive member 29 in this order. Similarly, it makes it easy for the air in the upper region R2 to flow into the lower region R1, passing through the second conductive member 29 and the through-membrane hole 22 in this order.

<Air Flow Through Through-Membrane Hole 22>

In the present embodiment, by providing the through-membrane hole 22 in the diaphragm 21, the air in the housing 11 flows through the through-membrane hole 22, resulting in the adjustment of the pressure inside the housing 11.

For example, when the pressure of the lower region R1 becomes higher as the user puts the earphone 1 on the user's ear, the air in the lower region R1 flows out of the housing 11 through the adjustment hole 14 via the through-membrane hole 22, whereby the pressure in the lower region R1 decreases so that the pressure in the lower region R1 and the pressure in the upper region R2 are balanced. The above-described air flow will be described with reference to FIG. 5.

Figure 5:
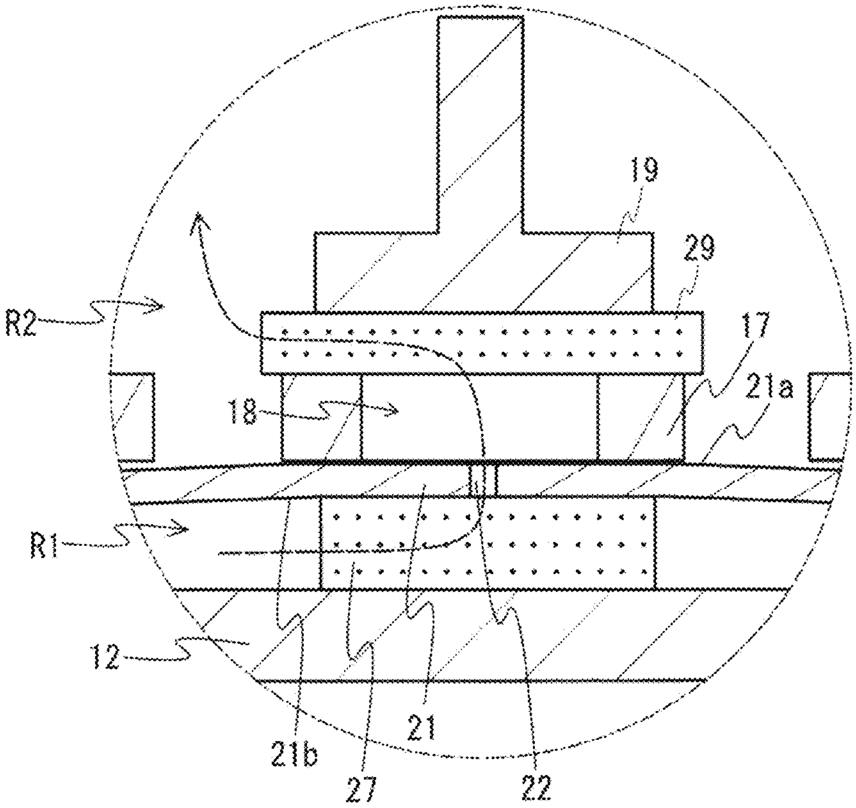
FIG. 5 schematically illustrates the flow of air through a through-membrane hole 22 of the diaphragm 21.

FIG. 5 schematically illustrates the flow of the air through the through-membrane hole 22 of the diaphragm 21. In FIG. 5, the flow of the air is shown by a dashed arrow. The air in the lower region R1 first flows toward the support member 27. The support member 27 has air permeability, and so the air reaching the support member 27 passes through the inside of the support member 27. The air then passes through the through-membrane hole 22 of the diaphragm 21 which is in contact with the support member 27. The air that has passed through the through-membrane hole 22 is directed to the second conductive member 29 via the through hole 18 of the fixed pole 17. The second conductive member 29 has air permeability, and so the air reaching the second conductive member 29 passes through the inside of the second conductive member 29. The air then flows through the upper region R2 to the adjustment hole 14 of the outer housing 13. Then, the air passes through the adjustment hole 14 and is discharged to the outside of the housing 11 (see FIG. 2).

It should be noted that, if the pressure in the upper region R2 is high, i) a flow opposite to the flow described above occurs (in other words, the air in the upper region R2 flows out of the housing 11 through the nozzle 15 and the through-membrane hole 22) and ii) the air is discharged through the adjustment hole 14 to the outside of the housing 11, whereby the pressure in the lower region R1 and the pressure in the upper region R2 are balanced.

If the through-membrane hole 22 is provided in the central portion of the diaphragm 21 (the portion supported by the support member 27), a path through which the air flows can be formed by utilizing the central portion of the diaphragm 21 that does not vibrate. Further, by providing the through-membrane hole 22 in the diaphragm 21 which divides the inside of the housing 11 into the lower region R1 and the upper region R2, the configuration of the housing 11 becomes simpler than that of a comparative example shown in FIG. 6. The effectiveness of the present embodiment will be further described below in comparison with the comparative example.

Figure 6:
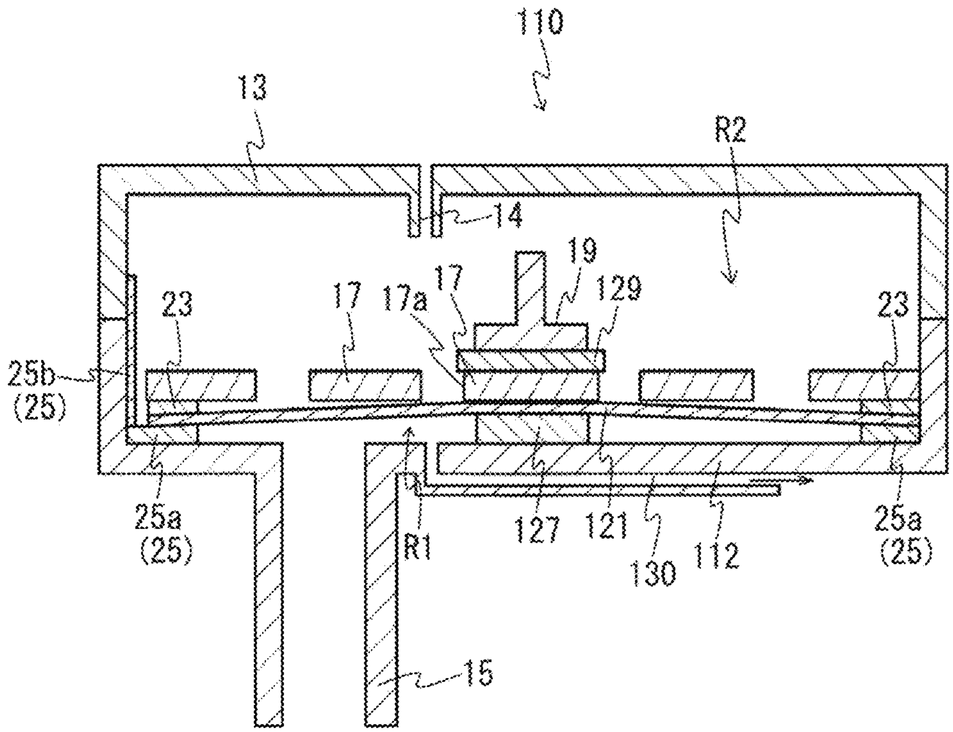
FIG. 6 is a schematic diagram for explaining a comparative example.

FIG. 6 is a schematic diagram for explaining the comparative example. Unlike the diaphragm 21 described above, a through-membrane hole is not formed in a diaphragm 121 of an electroacoustic transducer 110 of the comparative example. Therefore, in the comparative example, in addition to the adjustment hole 14 provided in the outer housing 13 for allowing the air in the upper region R2 to flow out of the housing, an adjustment flow path 130 for the air in the lower region R1 to flow out of the housing is provided in an ear-side housing 112. Further, a support member 127 and a second conductive member 129 are different from the support member 27 and the second conductive member 29 in that they do not have air permeability.

The adjustment flow path 130 is a flow path through which air flows. For example, when adjusting the pressure in the lower region R1, the air in the lower region R1 flows to the outside of the housing 11 through the adjustment flow path 130. To avoid directing the airflow in the adjustment flow path 130 towards the user's ear, the adjustment flow path 130 is elongated along an outer surface of the ear-side housing 112, as shown in FIG. 6. In particular, in order to reduce the influence on the acoustic characteristics, the diameter of the adjustment flow path 130 is reduced and the flow path length of the adjustment flow path 130 is increased. The structure of the ear-side housing 112 is more complex due to having such an adjustment flow path 130 formed, and this increases the manufacturing cost of the ear-side housing 112. For example, it is desirable that the diameter of the adjustment flow path 130 is about 0.1 mm, but this requires a precise mold as well as fine care during the assembly of the molds. In contrast, in the case of the present embodiment, the air in the lower region R1 flows to the outside of the housing 11 through the through-membrane hole 22, without providing the adjustment flow path 130 in the ear-side housing 12. This simplifies the structure of the ear-side housing 12.

Variation

Figure 7:
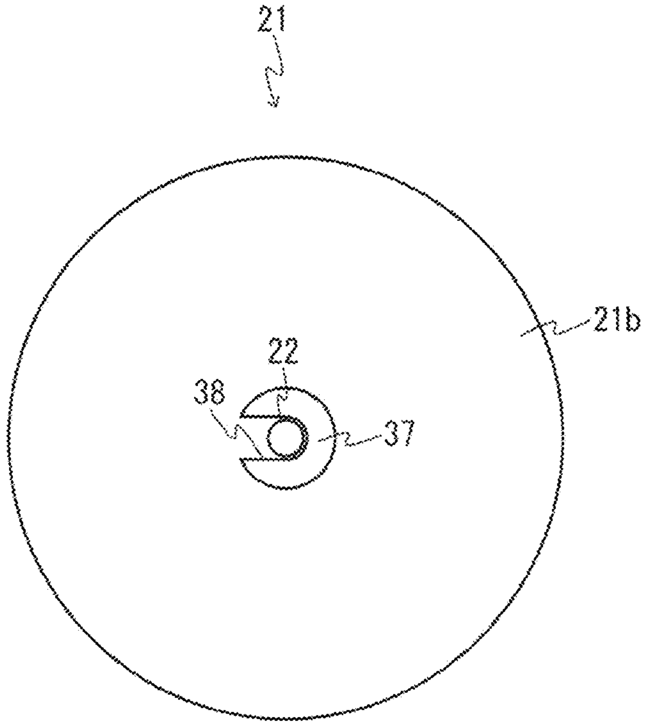
FIG. 7 schematically illustrates a configuration of a support member 37 of a variation.

FIG. 7 schematically illustrates a configuration of a support member 37 of a variation. FIG. 7 shows the relationship between the through-membrane hole 22 of the diaphragm 21 and the support member 37.

The support member 27 of the above-described embodiment is disposed to cover the entire through-membrane hole 22 of the diaphragm 21 (see FIG. 4). In contrast, in the variation, a notch portion 38 is formed in a portion of the cylindrical support member 37 facing the through-membrane hole 22, so that the through-membrane hole 22 is exposed, as shown in FIG. 7. That is, the notch portion 38 is notched along an axial direction so as to form a U shape when the support member 37 is viewed in a planar view. With such a support member 37, there is superior air permeability to the through-membrane hole 22 and a wider choice of material for the support member 37. For example, changing the material of the support member 37 to another material has little effect on the air permeability.

By providing the notch portion 38 in the support member 37, the air in the lower region R1 can easily reach the through-membrane hole 22 through the notch portion 38, for example. In other words, in the variation, the air is likely to reach the through-membrane hole 22 without passing through the inside of the support member 37. Therefore, the support member 37 does not have to be formed of a member having air permeability. However, the present disclosure is not limited thereto, and the support member 37 may be formed of a member having air permeability.

The shape of the support member 37 is not limited to the shape shown in FIG. 7, and for example, a hole penetrating the central portion of the cylindrical support member 37 along an axial direction (the diameter of the hole is larger than the diameter of the through-membrane hole 22) may be formed. If the support member 37 has such a shape, the through-membrane hole 22 does not contact the support member 37, and therefore it is possible to suppress the occurrence of variation in the air permeability caused by a small through-membrane hole 22 being obstructed more than expected due to, for example, a difference in individuality of the support member 37 or a difference in pressing strength against the diaphragm 21.

Only one through-membrane hole 22 is shown in FIG. 7, but a plurality of through-membrane holes 22 may be provided, and in this case, the notch portion 38 of the support member 37 is formed so as to face at least one through-membrane hole 22 of the plurality of through-membrane holes 22 (for example, two through-membrane holes 22 of the five through-membrane holes 22).

Figure 8A:
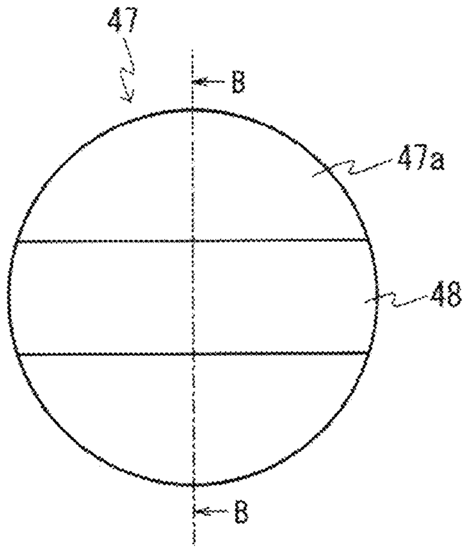
FIG. 8A schematically illustrates a configuration of a support member 47 of the variation.
Figure 8B:
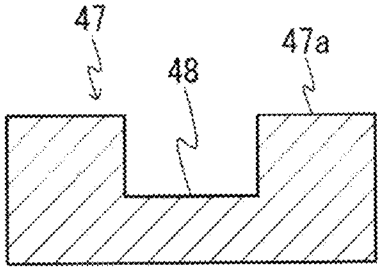
FIG. 8B schematically illustrates a configuration of a support member 47 of the variation.

FIGS. 8A and 8B schematically illustrate configurations of a support member 47 of the variation. FIG. 8A is a planar view of the support member 47, and FIG. 8B is a cross-sectional view at a line B-B in FIG. 8A. In the support member 47, a groove portion 48 serving as a notch portion is formed in an upper surface 47*a* which is in contact with the lower surface 21*b* of the diaphragm 21 (see FIG. 2). The groove portion 48 is formed linearly along a radial direction through the center of the support member 47 on the upper surface 47*a* of the cylindrical support member 47. Further, the groove portion 48 is formed at a position so as to face the through-membrane hole 22. Therefore, the air in the lower region R1 is likely to reach the through-membrane hole 22 through the groove portion 48 (see FIG. 5). By providing the groove portion 48 to the support member 47, the support member 47 has superior air permeability to the through-membrane hole 22 and allows for a wider choice of the material for the support member 47, in the same manner as in the case of the support member 37 shown in FIG. 7.

In the case of the variation as well, the air in the housing 11 flows through the through-membrane hole 22.

For example, the air in the lower region R1 flows out of the housing 11 through the through-membrane hole 22.

Effects of the Present Embodiment

The earphone 1 of the above-described embodiment includes the diaphragm 21 provided so as to divide the space in the housing 11 into two, the support member 27 supporting the diaphragm 21 so that the central portion of the diaphragm 21 is in contact with the fixed pole 17, and the adjustment hole 14 formed in the outer housing 13 for adjusting the pressure inside the housing 11. Also, the through-membrane hole 22 penetrating the diaphragm 21 is formed in the central portion of the diaphragm 21.

As a result, the through-membrane hole 22 is provided in the central portion of the diaphragm 21 (a portion supported by the support member 27), and a path through which air flows can be formed by utilizing the central portion of the diaphragm 21 that does not vibrate. Further, since the diaphragm 21, which divides the inside of the housing 11 into the lower region R1 and the upper region R2, is provided with the through-membrane hole 22, the air in the lower region R1 flows out of the housing 11 through the adjustment hole 14 of the outer housing 13 and the pressure inside the housing 11 is adjusted, for example, and so the configuration of the ear-side housing 12 can be simplified.

Furthermore, the through-membrane hole 22 is provided, and so it is not necessary to provide the adjustment flow path (for example, the adjustment flow path 130 shown in FIG. 6) in the ear-side housing 12. This eliminates the need for adjusting the diameter and the flow path length of the adjusting flow path of the housing 11, thus facilitating design for air inflow and outflow in the housing 11. Moreover, there is no need to provide the adjustment flow path, and so the earphone 1 can be further miniaturized without impairing the sound quality. In addition, the adjustment of the diameter and the flow path length of the adjustment flow path is not necessary, which reduces a parameter affecting the acoustic characteristics (making it difficult to output low frequency ranges) and improves the ease of the acoustic design.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

What is claimed is:

1. An earphone comprising:

a housing that is connected with a nozzle for emitting sound to the outside;

a fixed pole that is fixed inside the housing;

a diaphragm that is provided so as to divide a space inside the housing into two, and vibrates in accordance with a potential difference generated between the diaphragm and the fixed pole facing each other;

a support part that supports the diaphragm such that a portion of the diaphragm is in contact with the fixed pole; and an adjustment hole that is formed so as to penetrate a wall of the housing on a side opposite to the one having the nozzle, from the perspective of the diaphragm, and adjusts a pressure inside the housing, wherein a through-membrane hole penetrating the diaphragm is formed in the portion of the diaphragm.

2. The earphone according to claim 1, wherein the support part covers the portion of the diaphragm on a side opposite to a side which is in contact with the fixed pole, and the support part is made of an elastic material having air permeability that allows air to pass through its inside.

3. The earphone according to claim 2, wherein the elastic material is a sponge.

4. The earphone according to claim 1, wherein the support part supports the diaphragm whose central portion is in contact with the fixed pole, the through-membrane hole is formed in the central portion of the diaphragm, and the support part covers the through-membrane hole.

5. The earphone according to claim 1, wherein the support part covers the portion of the diaphragm on a side opposite to a side which is in contact with the fixed pole, one or more of the through-membrane holes are formed in the diaphragm, and a portion of the support part that faces at least one of the through-membrane holes is a notch portion.

6. The earphone according to claim 5, wherein the notch portion is notched along an axial direction so as to form a U shape when the support part, having a cylindrical shape, is viewed in a planar view.

7. The earphone according to claim 5, wherein the notch portion is a groove portion formed in an upper surface of the support part, having a cylindrical shape, which is in contact with the diaphragm, and the groove portion is formed along a radial direction passing through a center of the support part facing the through-membrane hole.

8. The earphone according to claim 1, wherein the support part having elasticity is provided to be in contact with the diaphragm and the housing to be deformable due to displacement of the diaphragm.

9. The earphone according to claim 1, wherein the housing includes a first housing to which the nozzle is connected and a second housing that, along with the first housing, surrounds the space, and the adjustment hole is provided only in the second housing, among the first housing and the second housing.

10. The earphone according to claim 1, wherein a through hole is formed in a portion of the fixed pole which is in contact with the portion of the diaphragm, wherein the earphone further comprises:

a terminal that is provided on a side opposite the one with the diaphragm, from the perspective of the fixed pole, and is for supplying an electric signal to the fixed pole; and a conductive member that is provided between the fixed pole and the terminal so as to cover the through hole and has air permeability that allows air to pass through its inside.

* * * * *